Nov. 26, 1929.　　　T. U. WHITE　　　1,737,037
SUPERVISORY CONTROL SYSTEM
Filed March 12, 1926　　　10 Sheets-Sheet 3

Fig. 3.

WITNESSES:
G. S. Neilson
Samuel Ostroleuk

INVENTOR
Thomas U. White
BY
Wesley L. Carr
ATTORNEY

Nov. 26, 1929.　　　T. U. WHITE　　　1,737,037
SUPERVISORY CONTROL SYSTEM
Filed March 12, 1926　　10 Sheets-Sheet 6

WITNESSES:
G. J. Neilson
Samuel Kadrolenk

INVENTOR
Thomas U. White
BY
Chesley J. Carr
ATTORNEY

Nov. 26, 1929.   T. U. WHITE   1,737,037
SUPERVISORY CONTROL SYSTEM
Filed March 12, 1926   10 Sheets-Sheet 8

WITNESSES:
G. S. Neilson
Samuel ...

INVENTOR
Thomas U. White
BY
Wesley G. Carr
ATTORNEY

Nov. 26, 1929.                T. U. WHITE                    1,737,037
                        SUPERVISORY CONTROL SYSTEM
                         Filed March 12, 1926       10 Sheets-Sheet 9

Fig. 9.

INVENTOR
Thomas U. White
BY
ATTORNEY

WITNESSES:

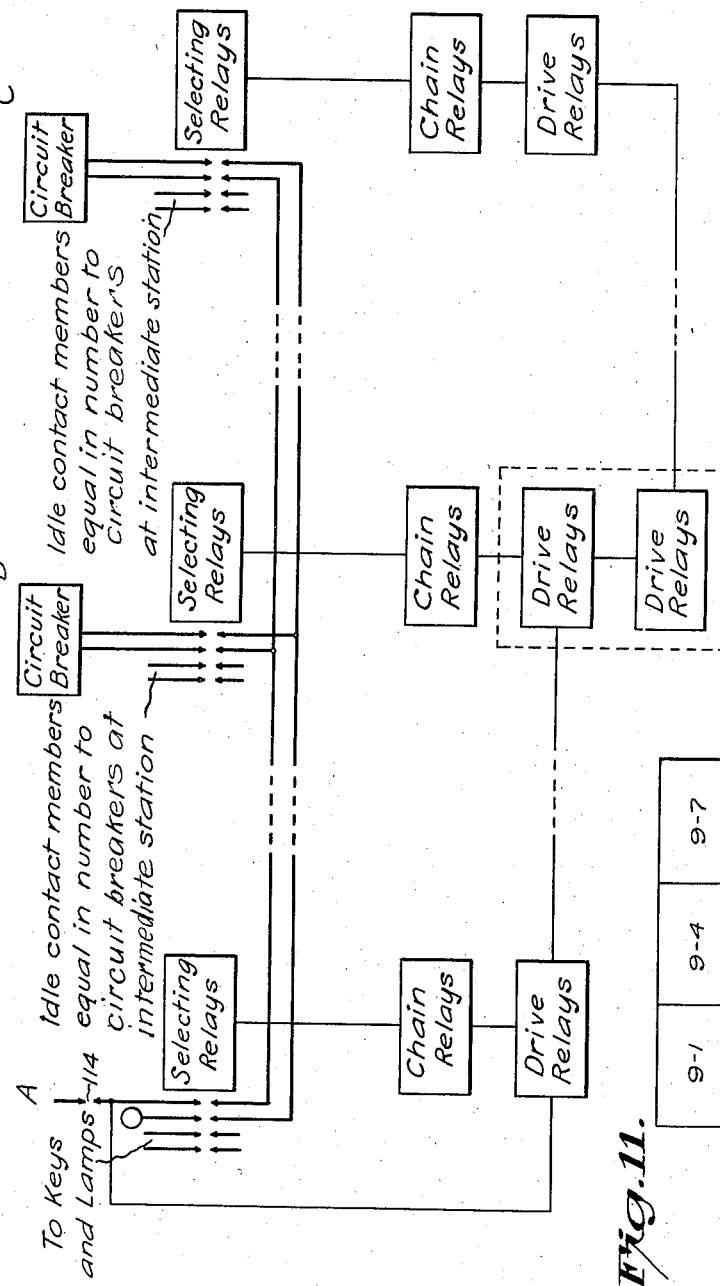

Patented Nov. 26, 1929

1,737,037

UNITED STATES PATENT OFFICE

THOMAS U. WHITE, OF PITTSBURGH, PENNSYLVANIA, ASSIGNOR TO WESTINGHOUSE ELECTRIC & MANUFACTURING COMPANY, A CORPORATION OF PENNSYLVANIA

SUPERVISORY CONTROL SYSTEM

Application filed March 12, 1926. Serial No. 94,185.

My invention relates to signalling systems and more particularly to tandem supervisory control systems.

An object of my invention is to provide means for controlling apparatus units at a plurality of stations from a main office.

Another object of my invention is to provide means for controlling a plurality of apparatus units at a plurality of stations over the same conductors from a main station.

Another object of my invention is to provide means for controlling apparatus at a plurality of stations over clear line wires.

Another object of my invention is to provide means for directly controlling apparatus units at a plurality of stations from a main station over common conductors.

There are other objects of this invention, which, together with the foregoing, appear in the specification which follows.

Heretofore in systems in which apparatus units at a plurality of stations were to be controlled from a common or main office, the control impulses were relayed by repeater apparatus at one of the intermediate stations to the more remote one. In actual operation, however, this was found to be impracticable because of the cost of the complex apparatus necessitated and also because of the danger of losing impulses over repeater circuits. Furthermore, the use of repeaters made it impossible to obtain direct control of apparatus units or to perform such functions as metering which are very desirable in supervisory control systems. In order to transmit metering signals from the substation to the office, it is necessary to provide a clear circuit independent of selecting apparatus between the two stations; that is, it is necessary to make a complete circuit from the transmitting meter to the receiving meter. Where repeaters are employed, this is impossible, but if the circuits are made clear of the selecting apparatus as in this case, metering is possible.

By means of my invention, it is possible to control apparatus units at a plurality of stations over common conductors, while still maintaining cleared line wires to the apparatus unit at any of the stations selected for operation.

In practicing my invention, I provide selector relays at a plurality of stations for associating individual units to a conductor between the first and intermediate station and a conductor between the intermediate and remote station, predetermined selector relays at the intermediate station functioning to so connect the two signalling conductors as to produce a continuous conductor from the first to the third station.

Referring to the drawings,

Figures 1, 2 and 3 disclose the apparatus and their circuits at the main office;

Figs. 4, 5 and 6 disclose the apparatus and their circuits at an intermediate substation; and Figs. 7, 8 and 9 disclose the apparatus and their circuits at a more remote substation.

Fig. 10 is a diagrammatic view of the entire system; and

Fig. 11 illustrates the arrangement of the sheets of drawings.

Figure 1:
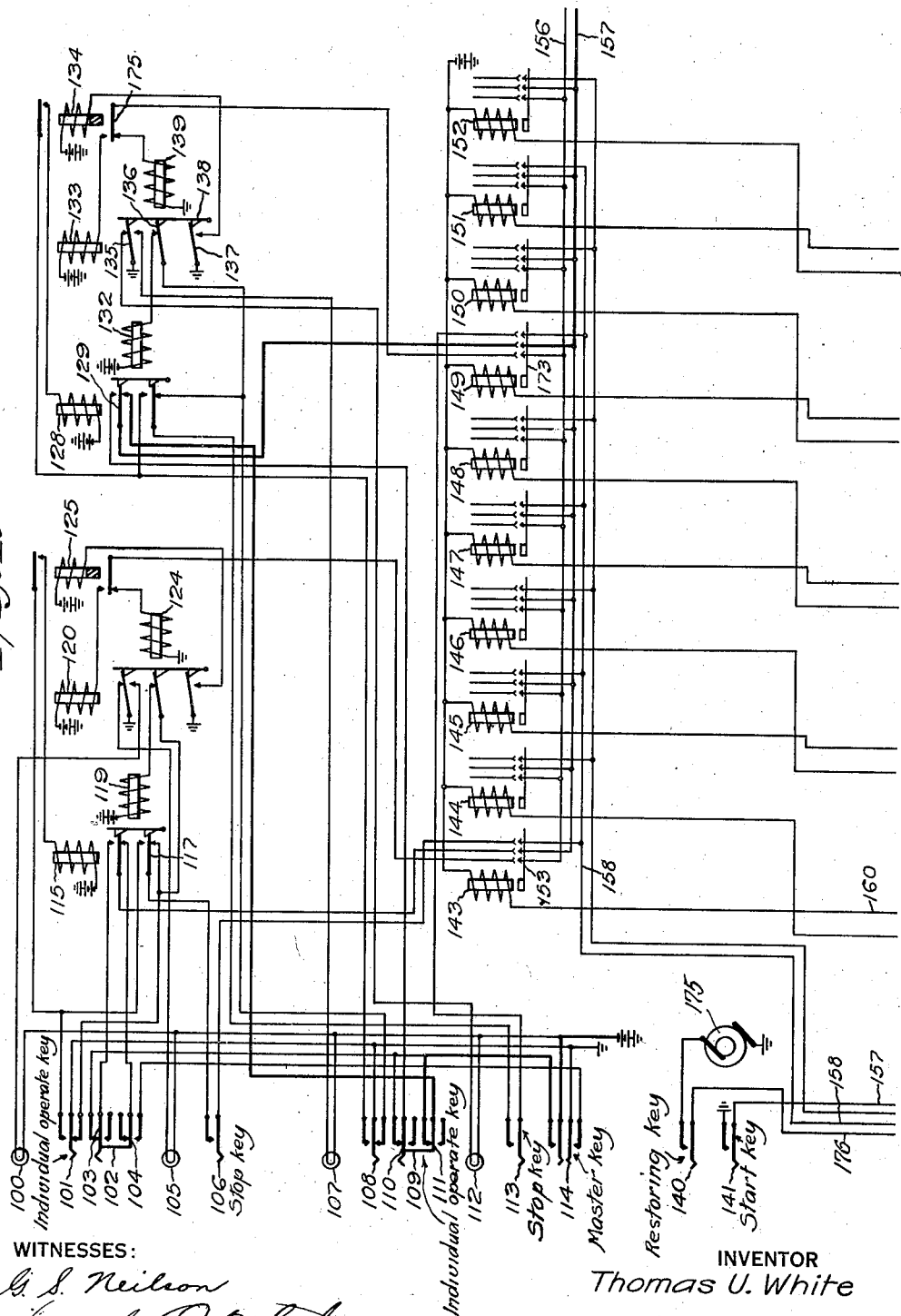
Figure 2:
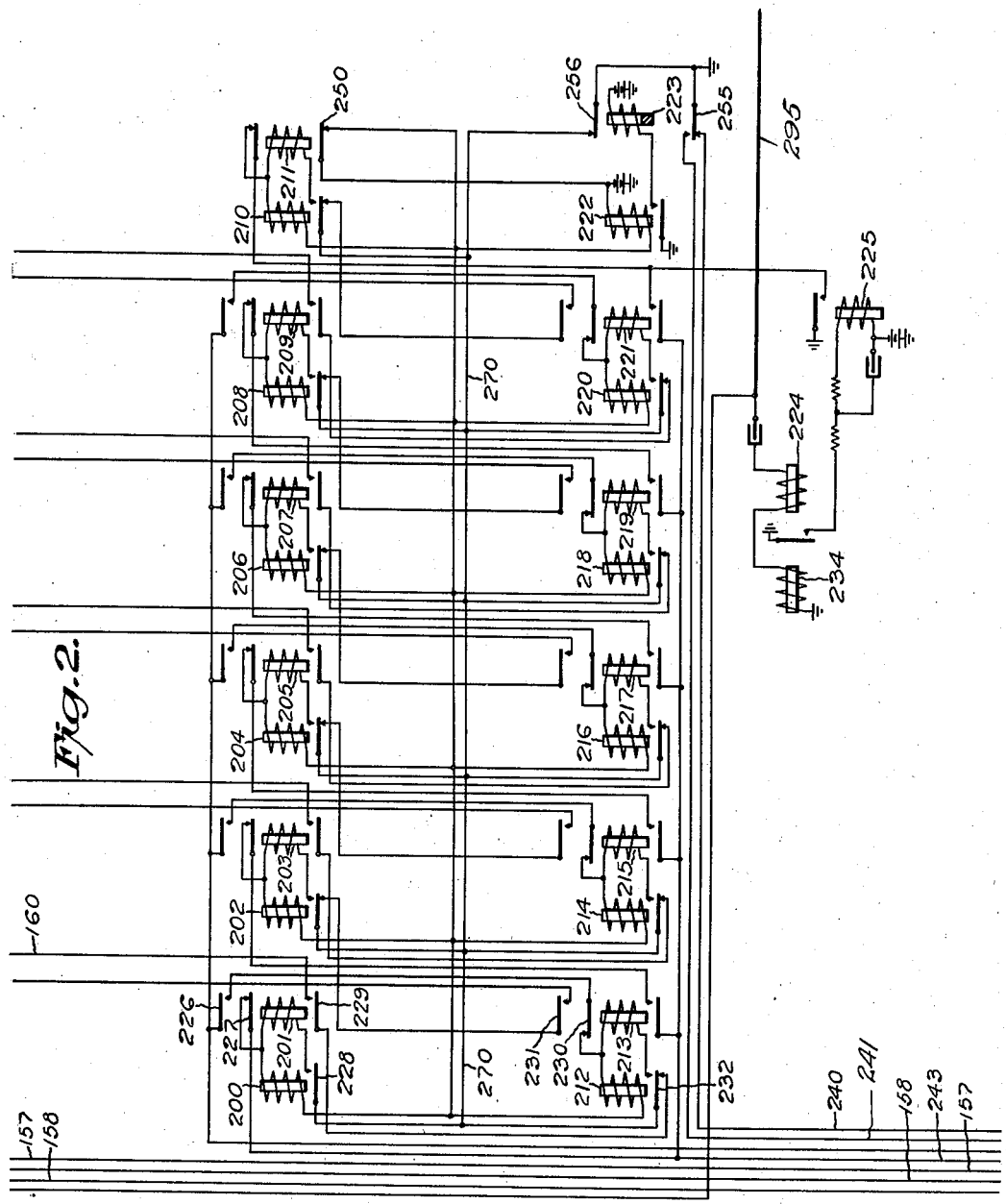
Figure 4:
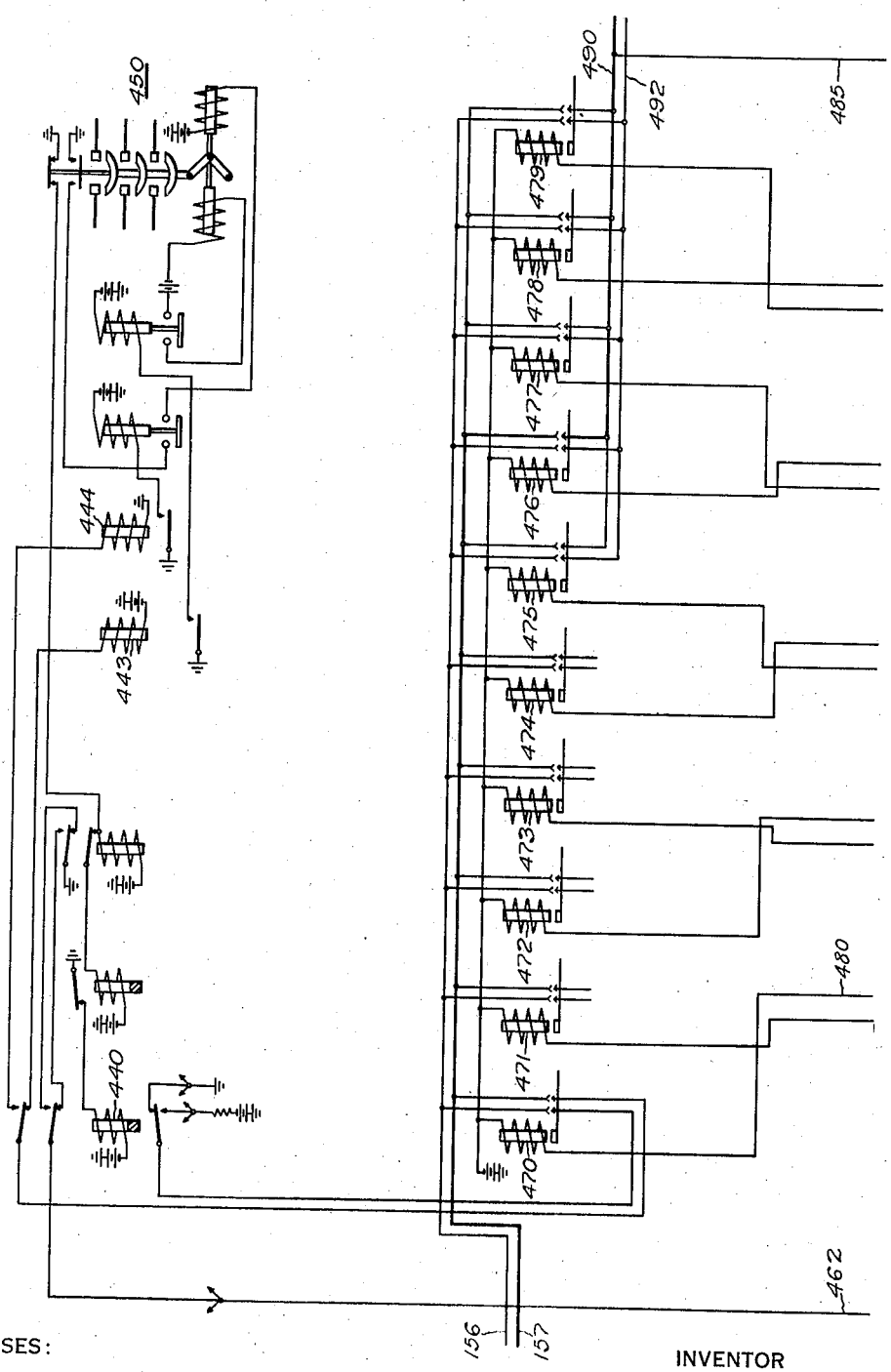
Figure 5:
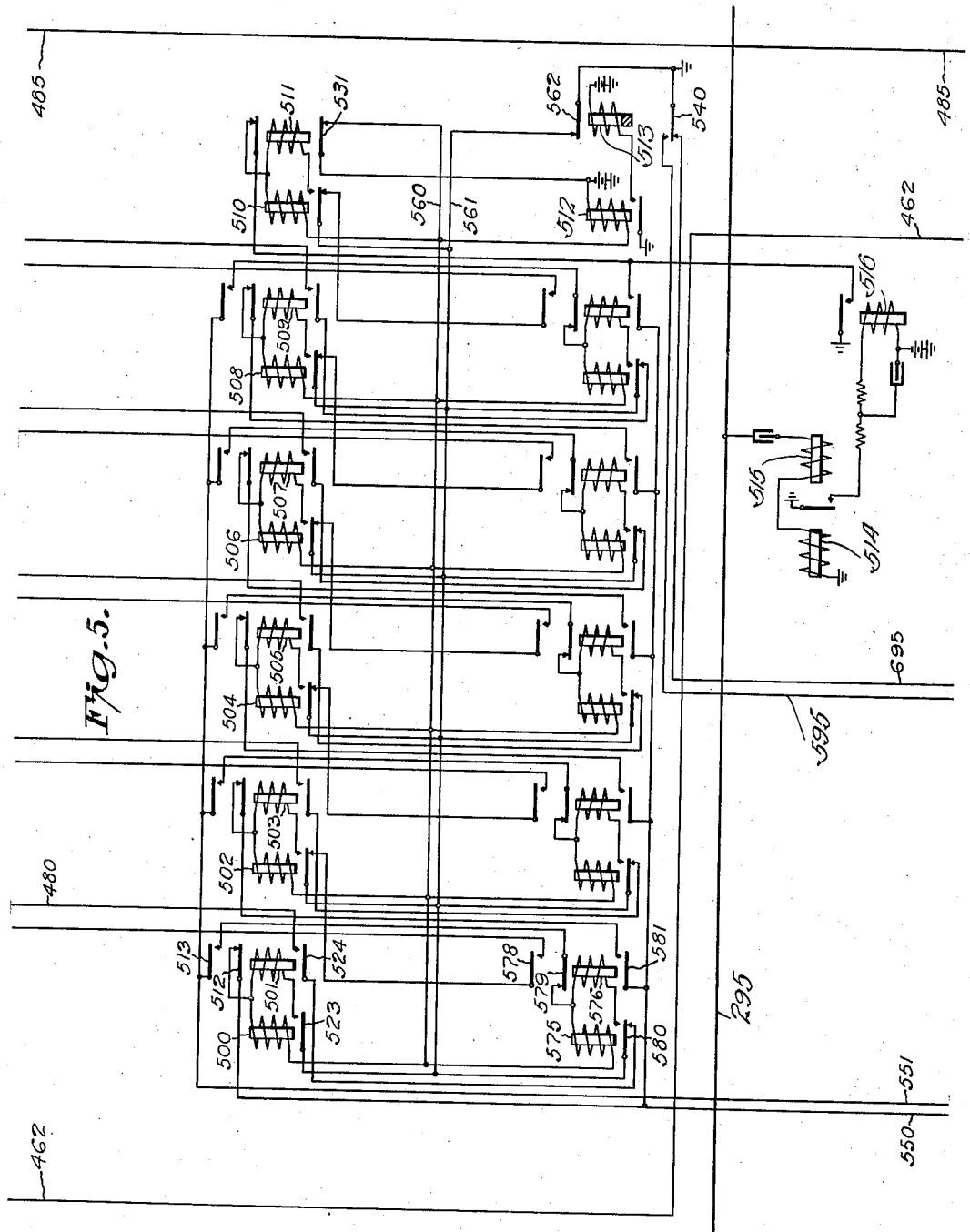
Figure 6:
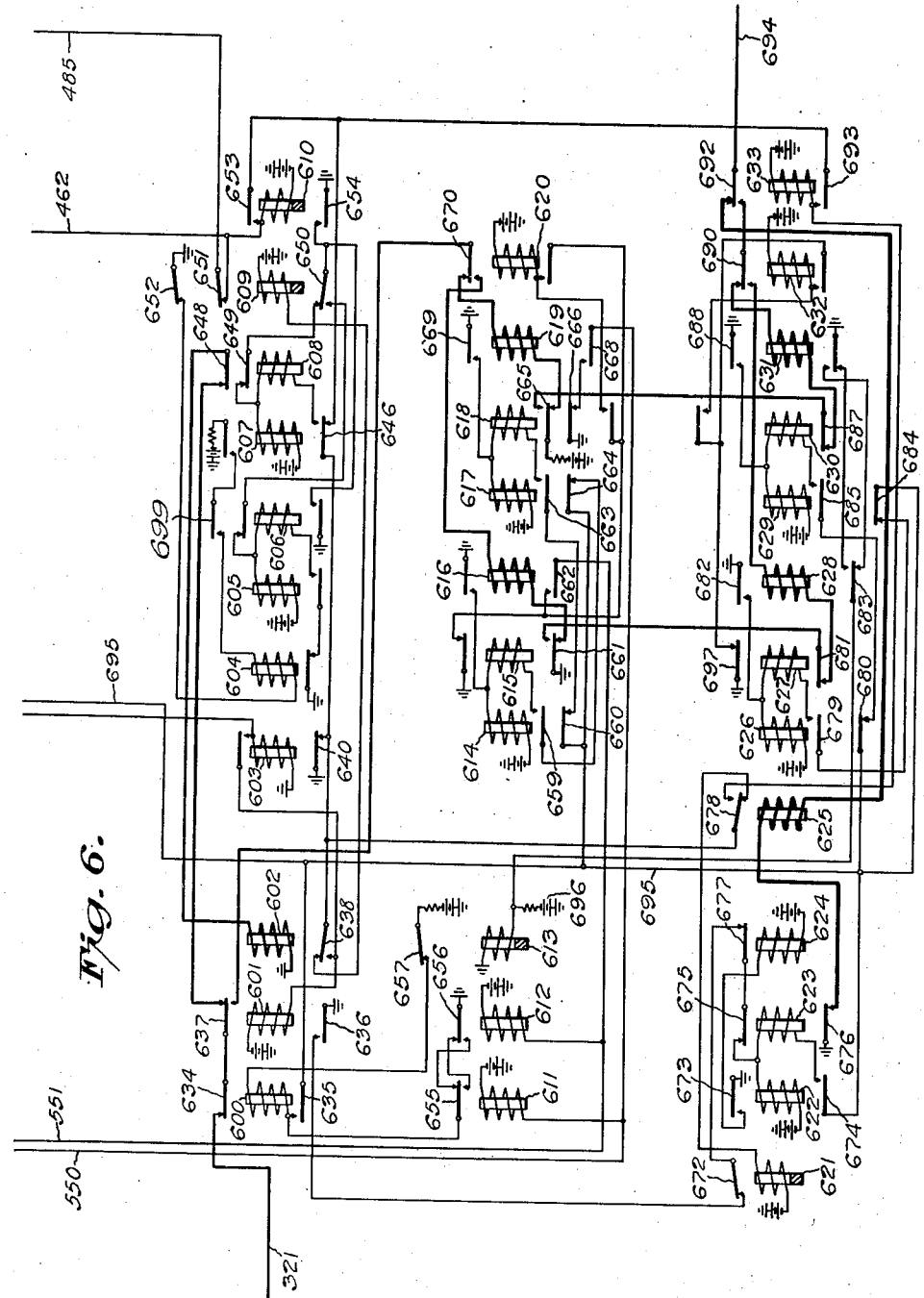
Figure 7:
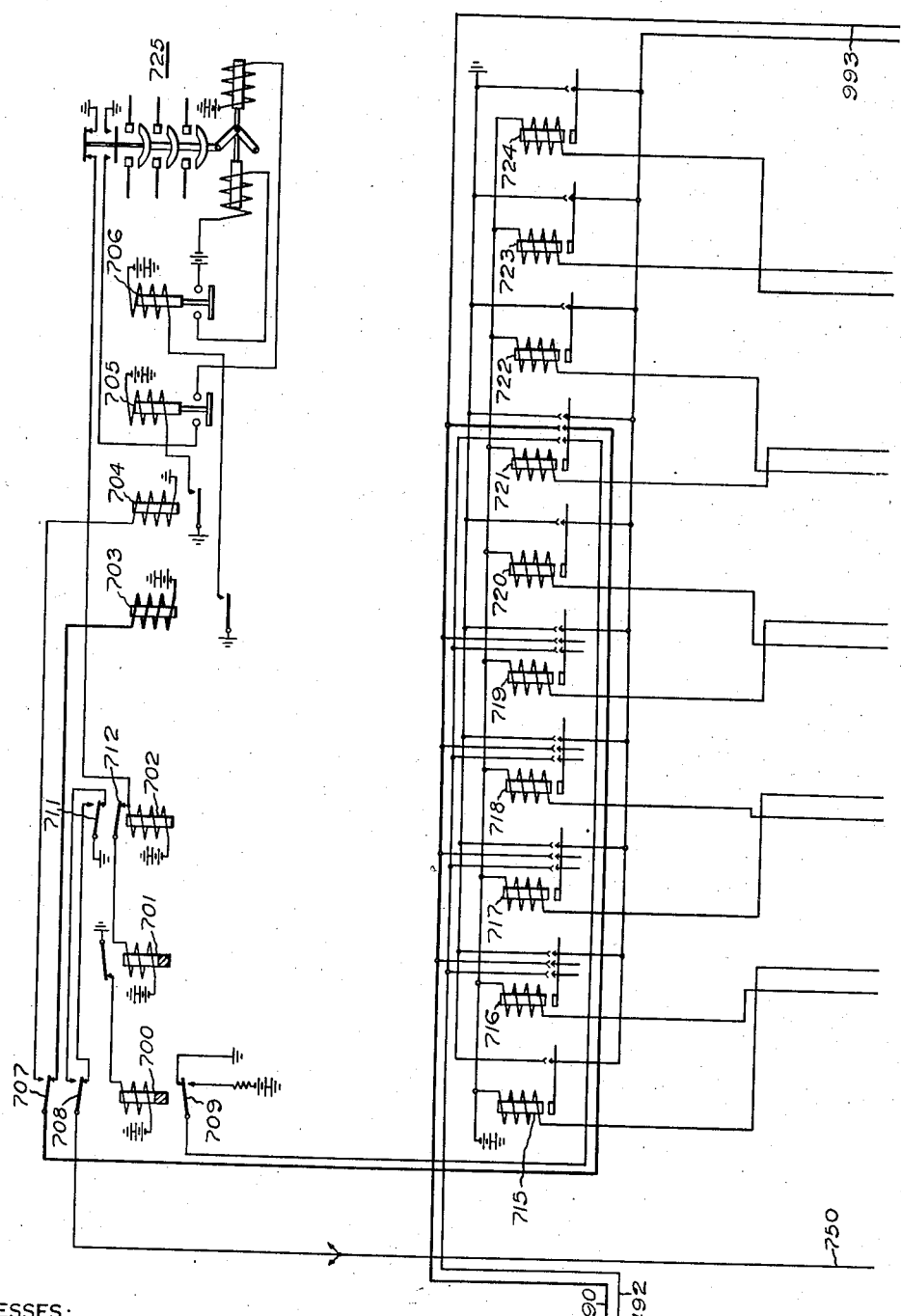
Figure 8:
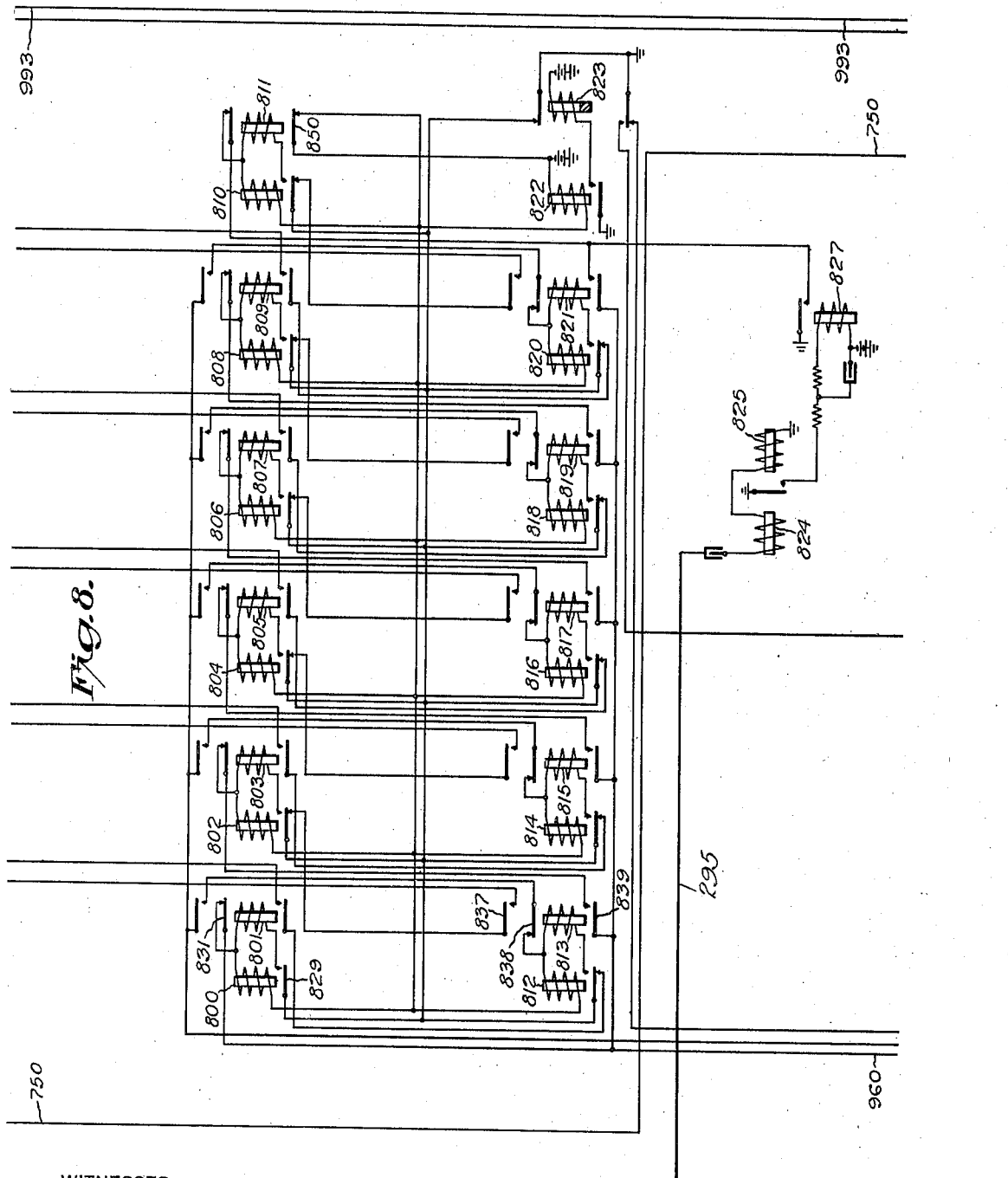

In general my invention comprises a first station, Figs. 1, 2 and 3, an intermediate station, Figs. 4, 5, and 6 and a remote station, Figs. 7, 8 and 9, the first two stations being connected by control and supervisory conductor 156 and 157, the last two by control and supervisory conductors 490 and 492, the selector relays 475—479 at the intermediate station connecting the control conductors to each other and the supervisory conductors to each other. The drive impulses are repeated from a circuit 321 between the first two stations to a circuit 694 between the last two stations for stepping the selector relays 143 to 152, 470 to 479 and 715 to 724 in synchronism.

Referring more specifically to Fig. 1, 100 to 114 and 140 and 141 represent the keys and their individual lamps located on the panel board at the dispatcher's office. Relays 115, 119, 120, 124, 125, 128, 132, 133, 134 and 139 are the supervisory and anti-pumping latching relays. These anti-pumping relays function to prevent the transmission of a second operating impulse in the case where the dispatcher has sent an impulse to operate a circuit breaker which thereupon closes on a short circuit and trips. Ordinarily a circuit would be again completed for reclosing the circuit breaker which would have serious and injurious effects upon the circuit breaker. The anti-pumping relays prevent this by opening the control circuit as soon as the circuit breaker has been closed once. Relays 143 to 152 are the selector relays.

Referring to Fig. 2, relays 200 to 223 are the counting chain relays for controlling the operation of the aforementioned selector relays. Relays 224, 225 and 234 are reset relays. These relays function to reset the counting relays to their normal position by opening the locking circuit for the counting relays in the manner in which they are restored after a complete cycle of operations as is described in detail in the specification hereinafter.

Referring to Fig. 3, relay 305 is the normally closed line relay and relays 302, 303, 304 and 306 are the start relays. Relays 322 to 328 are the synchronous drive relays and relays 300 and 301 are the stepover relays.

Referring to Fig. 4, circuit breaker 450 is illustrative of one of a plurality of circuit breakers at the intermediate station to be controlled. Relays 443 and 444 are the intermediate supervisory relays and relay 440 the switch relay for switching the control and supervisory circuits from one to the other alternative positions dependent upon the condition of the apparatus unit. Relays 470 to 479 are the selector relays for selecting one of the circuit breakers for operation.

Referring to Fig. 5, relays 500 to 511 are counting chain relays. Similar groups of counting relays are shown just below the above-named relays. Relays 512 and 513 are energized at the end of a complete cycle of relay operations to restore the counting relays to normal in a manner to be described in more detail hereinafter. Relays 514—516 are operated in response to an impulse transmitted over the line from the dispatcher's office to restore the counting relays to their normal position at any point in the chain.

Referring to Fig. 6, relay 602 is the line relay, relay 601 the switchover relay from the normal condition to the operating condition, relays 603 to 608 are the supervisory start relays, relays 609 and 610 the switchover relays, relays 614 to 616 and 617 to 619 are the synchronous drive relays and relay 620 is the switchover relay.

Similarly, relay 633 is the switchover relay operating when energized to switch the line from normal condition to the operating condition, relay 632 is the switchover relay operating to transfer the operating circuit from one set to another set of drive relays, relays 626 to 631 are the synchronous drive relays, and relay 625 controls relays 621 and 633.

Referring to Fig. 7, circuit breaker 725 is one of a plurality of circuit breakers to be controlled at the more remote station, relays 703 and 704 are the intermediate control relays, relays 701 and 702 the intermediate supervisory relays and relay 700 the switchover relay. Relays 715 to 724 are the selector relays.

Referring to Fig. 8, relays 800 to 823 are the synchronous chain relays and relays 824, 825 and 827 are reset relays.

Referring to Fig. 9, relay 910 switches the drive line from its normal closed condition to its operating condition, relay 911 is the relay for switching over from one group of drive relays 912 to 914 to the second group of drive relays 915 to 917, relays 900 to 909 being the supervisory start relays.

Referring to Fig. 10, a brief description of the operations will be given. Closing a key 114, the drive circuit between the first two stations A and B begins to operate their relay chains respectively. Simultaneously, impulses in the first drive circuit are repeated into the second drive circuit between stations B and C to operate the relay chain at station C. The three relay chains are thus operated in synchronism to operate their selector relays. The contact member of each selecting relay at the office is connected to a key. At the intermediate station, a certain number of the selector relays have their contacts connected to apparatus units and the remainder of the selector relays have idle contact members. These latter are equal in number to the units at the more remote station. Similarly, at the more remote station, there are idle selector relays equal in number to the units at the intermediate stations and the remainder control circuit breakers. The selector relays at the last two stations are so connected that only one active selecting relay is effective at a time.

In order to better understand the invention, a detailed description thereof will be given. Normally, when the apparatus is in a non-operating condition, there is an energizing circuit for the drive line 321 from ground through battery, armature 316 and its back contact, winding of relay 305, back contact and armature 320, drive conductor 321, the back contact and armature 634, armature 637 and its back contact, back contact and armature 648 and winding of relay 602 to ground.

The energization of the relay 305 at the dispatcher's office completes an energizing circuit for the relay 306 over the armature 318 and its front contact and opens an energizing circuit for the relay 307 at armature 317. The energization of the relay 306 prepares a start circuit for the relay 303 at armature 319 and its front contact. This circuit, as will be described hereinafter, is completed when the start key 141 is closed. At the intermediate station, as a result of the energization of the relay 602 over the drive circuit previously traced, an energizing circuit is completed for the relay 609 from ground, through battery, winding of relay 609, the front contact and armature 638 and back contact and armature 640 to ground.

Energization of the relay 609 prepares an energizing circuit for the relay 607 over armature 650 and its front contact, prepares an energizing circuit for the relay 610 at armature 651 at its front contact, and prepares an energizing circuit for the relay 604 at armature 652 and its front contact. The relay 610 is a start relay which functions when a circuit breaker at any station operates automatically.

There is also completed at this time a normal energizing circuit from the intermediate station represented by the circuits shown in Figs. 4, 5, and 6, to the more remote station represented by the circuits in Figs. 7, 8 and 9. This circuit, as in the case of the one just traced, is completed over the drive line connecting these two stations, from ground through armature 676 and its back contact, winding of relay 625, the back contact and armature 692, conductor 694, armature 934 and its back contact, winding of relay 905 and battery to ground.

The energization of the relay 625 at the intermediate station completes an energizing circuit for the relay 621 from ground, through battery, winding of relay 621, front contact and armature 678 and back contact and armature 640 to ground. The energization of relay 621 prepares an energizing circuit for the relay 622 at armature 672 which, as in the case of relay 303 at the dispatcher's office, is the start relay and which, upon energization, functions to start the apparatus into operation. In this case, the completion of the start circuit depends upon the energization of the relay 601 which, in turn, is energized following the operation of a key at the dispatcher's office. At the more remote station, as a result of the energization of the relay 905, an energizing circuit is completed for the relay 908 at armature 927 and its front contact, and an energizing circuit for the relay 910 is opened at 926.

The energization of the relay 908 prepares an energizing circuit for the relay 918 at armature 932 and opens a point in the energizing circuit of relay 906 at armature 931.

From the circuits thus far traced, it will be evident that there is a drive circuit extending between the first and the intermediate station and a second drive circuit from the intermediate to the third station, both of which are normally energized with the apparatus in a non-operating condition. It will be noted in the description to follow that these drive circuits, upon the operation of a key at the dispatcher's office or an apparatus unit at either of the remote stations, will be switched from their normal circuits to operating circuits.

Specifically, this is performed by causing the armature 320 at the office to move from its back to the front contact, and the armature 637 at the intermediate station from its back to its front contact. Similarly, over the second drive circuit, the armatures 692 and 934 are switched from their back to their front contacts. This switching connects the line drive relays, which are normally disconnected from the drive line to said line. The control and supervisory lines 156 and 157, connecting the stations, are normally opened.

Let it be assumed that the dispatcher desires to operate the circuit breaker 725 at the more remote station. In order to do this, he must momentarily close his start key 141. As a result of the closing of the start key 141 a circuit is completed from ground through the contact of this key, conductor 157, armature 319 and its front contact, winding of relay 303 and battery to ground. The energization of relay 303 prepares an energizing circuit for the relays 303 and 304 in series over armature 315 and its front contact, but this circuit is not effective at this time, due to the fact that the original energizing circuit for the relay 303 shunts the winding of relay 304

An instant later, however, the key 141 is again opened and the series locking circuit for the relays 303 and 304 becomes effective. The energization of relay 304 opens the formerly traced normally closed drive circuit at armature 316. As a result, the relay 305 at the dispatcher's office and 602 at the substation becomes deenergized. The deenergization of relay 305 prepares a locking circuit for the relay 302 at armature 318 and its back contact and completes an energizing circuit for the relay 307 over a circuit from ground through battery, winding of relay 307, armature 317 and its back contact and back contact and armature 314 to ground.

The energization of relay 307 transfers, as was noted heretofore, the drive line 321 from its normal position to the operating position over its front contact. At the intermediate station, the deenergization of relay 602 completes an energizing circuit for the relay 601 from ground through battery winding of relay 601, back contact and armature 638 and back contact and armature 640 to ground. The energization of the relay 601 functions doubly, first, to transfer the drive line at the substation from its normal non-operating position over the back contact of its armature 637, to its operating condition over its front contact, and also to complete the start circuit for the second drive circuit extending from the second to the third station in a manner similar to the operation of the start key at the dispatcher's office.

More particularly, operation of the armature 636 to close its front contact, completes an energizing circuit for the relay 622 over a circuit from ground through armature 636 and its front contact, the front contact and armature 672, the back contact and armature 677, armature 675 and its back contact, winding of relay 622 and battery to ground.

The energization of the relay 622 over the circuit just traced prepares an energizing circuit for the relays 622 and 623 in series over armature 674 and its front contact. This circuit, however, is not effective at this time, due to the fact that the original energizing circuit for the relay 622 shunts the winding of relay 623. Another result of the energization of the relay 622 is to complete an energizing circuit for the relay 624 over a circuit from ground through armature 673 and its front contact, the winding of relay 624 and battery to ground. The energization of relay 624 opens the original energizing circuit for the relay 622 at armature 677 and the series energizing circuit for the relays 622 and 623 becomes effective. This circuit is completed from ground through battery, windings of relays 622 and 623, in series, front contact and armature 674, conductor 695, and back contact and armature 540 to ground.

The energization of relay 623 opens the original normally closed drive circuit between the intermediate and the remote station at armature 676, thereby deenergizing relay 625 at the intermediate station and the relay 905 at the more remote station.

The deenergization of the relay 625 opens the energizing circuit for the slow-release relay 621 at armature 678 and completes an energizing circuit for the relay 633 from ground, through battery, winding of the relay 633, the back contact and armature 678 and back contact and armature 640 to ground. The energization of relay 633 completes a locking circuit for itself from ground through battery, winding of relay 633, front contact and armature 693, the back contact and armature 646 and back contact and armature 640 to ground, and also transfers the second drive circuit 694 from its normal non-operating condition at the back contact of armature 692 to its operating condition for controlling the drive relays at its front contact.

At the more remote station, as a result of the deenergization of relay 905, the energizing circuit for the relay 908 is opened at armature 927 and an energizing circuit is completed for the relay 910 over a circuit from ground through armature 924 and its back contact, armature 926 and its back contact, the winding of relay 910 and battery to ground.

The energization of relay 910 transfers the drive line 694 from its normal non-operating condition at the back contact of armature 934 to its operating condition for controlling the drive relay at its front contact.

The deenergization of relay 908 prepares an energizing circuit for the relay 906 at armature 931 and its back contact and opens a further point in the energizing circuit of the relay 918 at armature 932.

The circuits thus far traced indicate how the drive circuits are transferred from their normal non-operating condition to their operating condition, operation of the second drive circuit, of course, lagging by a very short interval of time the operation of the first driving circuit.

Returning now to the drive circuit connecting the first two stations, upon the energization of the relay 307 at the office and 601 at the intermediate station, as heretofore described, a circuit is completed from ground through armature 336 and its back contact, the winding of relay 323, its back contact and armature 340, front contact and armature 320, drive line 321, back contact and armature 634, armature 637 and its front contact, armature 670 and its back contact, winding of relay 619, back contact and armature 665 and battery to ground.

Relay 323 at the office and 619 at the substation are energized over this circuit. The energization of relay 323 at the office completes an energizing circuit for the relay 325 at armature 339 and its front contact and completes an energizing circuit for the first relay in the relay chain over a circuit from ground, armature 337 and its back contact, armature 338 and its front contact, conductor 243, armature 227 and its back contact, winding of relay 200, back contact and armature 250 and battery to ground.

The energization of the relay 200 prepares a series energizing circuit for the relay 200 and 201 in series but this circuit is not effective at this time, due to the fact that the normally energizing circuit for relay 200 shunts the winding of relay 201.

At the substation, as a result of the energization of relay 619, an energizing circuit is completed for the relay 617 over armature 669 and its front contact.

Energization of relay 617 prepares a series energizing circuit for itself and winding 618 at armature 663, which is not effective at this time, due to the original energizing circuit of relay 617. Energization of relay 617 also opens a possible locking circuit for the relays 614 and 615 at armature 664.

A further result of the energization of relay 619 is to complete an energizing circuit for the first relay chain from ground, armature 666 and its front contact, the front contact and armature 668, conductor 550, armature 512 and its back contact, winding of relay 500, back contact and armature 531 and battery to ground.

The energization of relay 500 prepares an energizing circuit for itself and winding of relay 501 in series at armature 523, but this circuit is not effective at this time. A further result of the energization of the relay 619 is to complete an energizing circuit for the relay 611 from ground through armature 666 and its back contact, front contact and armature 668, winding of relay 611 and battery to ground.

The energization of relay 611 completes an energizing circuit for the relay 600 from ground, armature 656 and its back contact, front contact and armature 655, winding of relay 600, back contact and armature 657 and battery to ground.

The energization of relay 600 over the circuit just traced completes a locking circuit for itself from ground through battery, armature 657 and its back contact, winding of relay 600, front contact and armature 635, conductor 695 and back contact and armature 540 to ground, and opens the drive line at armature 634. Opening the drive line results in the deenergization of the relay 323 at the dispatcher's office and 619 at the substation. The deenergization of the relay 323 opens the original energizing circuit for the relay 325 and a series locking circuit is now completed from ground through battery, windings of relays 325 and 324 in series, front contact and armature 335, back contact and armature 332, conductor 240 and back contact and armature 255 to ground.

The energization of the relay 324 opens a further point in the drive circuit at armature 336, opens a possible series locking circuit for the relays 328 and 327 at armature 346 and opens the original energizing circuit for the relay 200 at armature 337. The relays 200 and 201 are now energized in series over a circuit from ground through battery, armature 250 and its back contact, windings of the relays 200 and 201 in series, front contact and armature 228 and back contact and armature 256 to ground.

Energization of the relay 201 over the circuit just traced opens a further point in the original energizing circuit for the relay 200 at armature 227, completes an energizing circuit for the selecting relay 143 over armature 229 from ground through battery, winding of relay 143, conductor 160, the front contact and armature 229, back contact and armature 232, conductor 270 and back contact and armature 256 to ground, and prepares an energizing circuit for the relay 212 over armature 226 and its front contact. The energization of the selecting relay 143 connects the first individual control key at the dispatcher's office to the control line 157 over the contacts of the selector switch and completes an energizing circuit for the relay 300 from ground through battery, winding of the relay 300, conductor 158, the third contact of bank 153, closed contact of the key 106, armature 117 and its back contact and the lower contact of key 101 to ground. The stop key 113 cooperates with the armature 130 in the manner just described in connection with the key 106 and the armature 117, to control an additional apparatus unit. The keys 101 and 108 when in the position shown, in conjunction with the stop keys 106 and 113, respectively, control the operation of the selecting relay chains, as will be described in more detail hereafter.

Energization of the relay 300 over the circuit just traced completes a locking circuit for itself from ground through battery, winding of the relay 300, front contact and armature 308, back contact and armature 312, conductor 240 and back contact and armature 255 to ground, opens a locking circuit for the relay 301 at armature 310 and completes an energizing circuit for the relay 322 at armature 309 and its front contact, thereby switching the drive circuit from the first group of drive relays 323 to 325 to the second group of drive relays 326 to 328. It will be noted from the description above that the operation of the second drive impulse about to be described is dependent upon the energization of the relay 300 which, in turn, energizes 322 to switch the control line to its alternate position, thereby enabling the transmission of a second drive impulse. The circuit for the relay 300 is completed over the contacts of the stop key and the selecting relays in multiple. If upon energization of selecting relay, the individual stop key at that point has been pulled out so that the contacts are open, no circuit will be completed for the relays 300 or 301, and as a result no switching of the drive line will take place and therefore no further impulsing over the drive line. In this manner, the driving circuit can be stopped so as to bring the selecting relays to a stop at any desired position. In the meanwhile, at the intermediate station, it will be recalled that the relay 619 was deenergized as a result of the opening of the drive line at armature 634 simultaneously with the deenergization of relay 323, the effects of which have been described.

Upon the deenergization of the relay 619, the series locking circuit for the relays 617 and 618 from ground through battery, windings of relays 617 and 618, front contact and armature 663, back contact and armature 660, conductor 695 and back contact and armature 540 to ground becomes effective.

The energization of the relay 618 opens the original energizing circuit for the relay 500, and the relay 501 is energized. The circuit is completed from ground through battery, armature 531 and its back contact, conductor 560, windings of relays 500 and 501 in series, front contact and armature 523, conductor 561 and back contact and armature 562 to ground. The energization of the relay 501 over the circuit just traced opens a further point in the energizing circuit of relay 500 at armature 512, prepares an energizing circuit for the relay 575 at armature 513, and completes an energizing circuit for the selector relay 470 from ground through battery, winding of relay 470, conductor 480, front contact and armature 524, back contact and armature 580 and armature 562 to ground.

The energization of the selector relay 470 at the intermediate station, connects the first apparatus unit at that station with the control and supervisory line. This relay at the substation, of course, energizes simultaneously with the relay 143 at the office so that the individual control key and supervisory lamp for the first circuit breaker is connected to the control and supervisory line simultaneously with the connection of the circuit breaker at the substation to said supervisory and control line and the unit, therefore, comes under the direct control of the dispatcher.

Thus it will be seen that, in order to cause the operation of a circuit breaker, it is only necessary that the stop key, such as 106 or 113, associated with the breaker which it is desired to operate, be closed. The individual operate key of the same circuit breaker is also actuated to the desired position, namely, close or trip. The two operate keys shown in Figure 1 have the contact springs 101, 103, 104, and 108, 109, 111, respectively. When the stop key and the individual operate key of the circuit breaker have been operated, the start key is actuated to cause the synchronous operation of the relay chain selectors. When the desired circuit breaker has been selected and connected to the line connecting the control station with the remote station, as hereinbefore described, the operation of the selecting relays ceases. In order to effect the operation of the circuit breaker, it is now necessary only to actuate the master key 114 which results in the desired operation being performed.

When the desired circuit breaker has been operated, the relay chain selectors automatically resume operation after an indication of the circuit breaker operation has been transmitted to the control station, as will be described in detail hereinafter.

A further and very important result of the energization of the relay 618 is to complete an energizing circuit over the second drive line from ground through battery, armature 665 and its front contact, armature 687 and its back contact, winding of relay 631, back contact and armature 690, front contact and armature 692, conductor 694, armature 934 and its front contact, back contact and armature 921, armature 935 and its back contact and winding of relay 915 and back contact and armature 945 to ground.

The energization of the relay 915 completes an energizing circuit for the relay 917 at armature 944 and completes an energizing circuit for the first relay in the chain from ground, through armature 943 and its front contact, back contact and armature 947, conductor 960, armature 831 and its back contact, winding of relay 800, back contact and armature 850, and battery to ground. The energization of relay 800 prepares an energizing circuit for the relays 800 and 801 at armature 829, which is not effective at this time. As a result of the energization of relay 917, a series circuit is prepared for the relays 916 and 917 in series over armature 970, which is not effective at this time and the possible series locking circuit for the relays 913 and 914 is opened at armature 971.

At the intermediate station, as a result of the energization of relay 631 over the circuit just traced, an energizing circuit is completed for the relay 629 at armature 688. Energization of the relay 629 completes an energizing circuit for the relays 629 and 630 in series at armature 685, which is not effective at this time and opens a possible series circuit for the relays 626 and 627 at armature 684.

A further result of the energization of relay 631 is to complete a by-pass for the battery 696 and thereby shunts the winding of relay 613. Relay 613 is a slow-release relay and, after an interval of time, is deenergized to open the contact at its armature 657 and as a result opens the locking circuit for the relay 600.

It will be seen from the description thus far, that the drive circuit between the office and the intermediate station functions in the usual normal manner to energize the relay chain and in turn the selector relay. It performs one function additional to that already known in the art, namely, to control the drive circuit from the second to the third station, which, when properly energized, in turn recloses the first drive circuit to permit it to function a second time. Thus, an inter-relation is created between the first and second drive circuits, which necessitates their functioning in synchronism, since the first drive circuit cannot again operate unless the second has followed the first in its operation.

It will be recalled that at the dispatcher's office, as a result of the energization of the first selector relay, the relay 300 was energized to in turn energize the relay 322, which thereupon switched the drive circuit from the first to the second group of drive relays. At the intermediate station, simultaneously with the energization of relay 618, which repeated impulses from the first to the second drive circuit, the relay 620 was energized, which transferred the first drive circuit from the first to the second group of drive relays.

Now, upon the deenergization of relay 600, as already described, the drive circuit is again completed but this time from ground at the office, through battery, armature 330 and its back contact, winding of relay 326, front contact and armature 340, front contact and armature 320, conductor 321, back contact and armature 634, armature 637 and its front contact, armature 670 and its front contact, winding of relay 616 and back contact and armature 661 to ground. This circuit, it will be noted, is from battery at the office to ground at the substation, thereby reversing the polarity of the first drive impulse, which was from ground at the office, to battery at the substation.

Since the circuits which result from the energization of relays 326 at the office and 616 at the substation over the second drive circuit, are similar to those described in connection with the first circuit, it is believed that the operation will be sufficiently clear if the steps which follow are merely stated without the circuits, which are very similar to those already described.

At the dispatcher's office, the energization of the relay 326 closes a circuit for the relay 328 over armature 333 which in turn prepares a series locking circuit for itself and relay 327 over armature 329 which circuit is not effected at this time. A further result of the energization of relay 326 is to close an energizing circuit for relay 212 at armature 334.

At the intermediate station, the energization of relay 616 completes an energizing circuit for the relay 614. The energization of the relay 614 prepares a series energizing circuit for itself and relay 615 which is not effective at this time. The energization of the relay 614 opens a series circuit for the relays 617 and 618 at armature 660.

A further result of the energization of relay 616 is to complete an energizing circuit over its armature 662 and conductor 551 for the relay 575 which energizes to in turn prepare a series circuit for itself and relay 576, which is not effective at this time. The energization of relay 575 opens the energizing circuit for the first selecting relay 470 at armature 580 and the armature of this last relay drops to its back position.

A further result of the energization of relay 616 is to complete an energizing circuit for the relay 612 which in turn completes an energizing circuit for the relay 600.

The energization of the relay 600 opens the drive line thereby deenergizing the relay 326 at the office and 616 at the substation. Deenergization of the relay 326 at the office opens the original energizing circuit for the relay 328 and the series locking circuit is thereupon completed for itself and relay 327. Energization of the relay 327 opens a series locking circuit for the relay 325 and 324 in series, opens a further point in the drive circuit at armature 330 and a further point in the original energizing circuit for the relay 212 at armature 331. The opening of the energizing circuit for the relay 212 makes the series energizing circuit for the relays 212 and 213 in series effective.

The energization of the relay 213 opens a further point in the original energizing circuit for the relay 212 at armature 230 and closes a circuit for the second selecting relay 144 at armature 231. As a result of the energization of the second selector relay 144 a circuit is completed for the relay 301 similar to that of 300 which locks itself up over armature 311 and opens the locking circuit for relay 300 at armature 312. Deenergization of the relay 300 opens the energizing circuit for the relay 322 and the armature 340 drops to its back or original position.

At the substation as a result of the opening of the drive line and subsequent deenergization of the relay 616, the series locking circuit for the relays 614 and 615 becomes effective over armature 659, and the series locking circuit for the relay 617 and 618 is opened at armature 660.

A further result of the deenergization of the relay 616 is to open the energizing circuit for the relay 612 as well as the original energizing circuit for the relay 575. Opening the original energizing circuit of relay 575 makes effective the series locking circuit for relays 575 and 576. Energization of relay 576 opens a further point in the original energizing circuit for the relay 575 at armature 579, closes an energizing circuit for the second selecting relay 471 at armature 578 and prepares an energizing circuit for the next relay in the chain 502 at armature 581. The deenergization of the relay 612 opens the original energizing circuit for the relay 600, but this relay remains locked over its armature 635.

A further result of the energization of relay 615 is to complete the second drive circuit between the intermediate and more remote station, from ground through armature 661 and its front contact, armature 681 and its back contact, winding of relay 628, front contact and armature 690 front contact and armature 692, conductor 694, armature 934 and its front contact, back contact and armature 921, armature 935 and its front contact, winding of relay 912, back contact and armature 939 and battery to ground.

The energization of relay 628 at the intermediate station over the circuit just traced completes an energizing circuit for the relay 626 at armature 682. Energization of relay 626 prepares an energizing circuit for itself and winding of relay 627 at armature 679, and opens the former series locking circuit for the relays 629 and 630 at armature 680.

At the remote station, energization of relay 912 completes an energizing circuit for the relay 914 at armature 937 and completes an energizing circuit for the second pair in the relay chain 812 at armature 936. The energization of the relay 914 prepares a series locking circuit for itself and winding of relay 913 at armature 941 and opens the series locking circuit for the relays 916 and 917 at armature 942.

A further result in the energization of relay 912 is to complete an energizing circuit for the relay 901 at armature 936. The energization of relay 901 completes an energizing circuit for the relay 900 which locks itself up over its armature 919 and opens the drive circuit at armature 921.

Returning now to the intermediate station, upon the energization of the relay 628 the winding of relay 613 is shunted. This is a slow-release relay and after an interval of time it will permit its armature 657 to drop to its back position thereby opening the locked energizing circuit of the relay 600.

The deenergization of the relay 600 closes the drive line which is now a duplicate of that originally traced for the first impulse. At the more remote station upon the opening of the drive circuit due to the energization of relay 900, the relay 912 at that station and the relay 628 at the intermediate station are deenergized. Deenergization of the relay 628 at the intermediate station opens the shunted path for the battery 696 at armature 683. The relay 613 is again energized to prepare an energizing circuit for the relay 600.

A further result of deenergization of relay 628 is to open the original energizing circuit for the relay 626 which is thereupon energized in series with relay 627 over armature 679. The energization of the relay 627 opens a further point in this second drive circuit at armature 681 and opens the locking circuit for the relay 632 at armature 697.

At the more remote station, the deenergization of the relay 912 opens the original energizing circuit for the relay 914 at armature 937 and the relays 914 and 913 are energized in series over armature 941.

A further result of the deenergization of relay 912 is to open the original energizing circuit for the relay 812 at armature 936. The energization of the relay 913 opens a further point in the line circuit at armature 939 and opens the locking circuit for relay 911 at armature 940.

The opening of the original energizing circuit of the relay 812 completes an energizing circuit for itself and relays 812 and 813 in series. The energization of the relay 813 prepares an energizing circuit for the next relay of the chain at armature 839 opens a further point in the original energizing circuit for the relay 812 at armature 838 and closes a circuit for the next selector relay 716 at armature 837.

The energization of the second selecting relay closes a shunted path for the battery of relay 903. This is a slow-to-release relay and after an interval of time drops its armature 923 to its back position. The deenergization of relay 903 opens the locking circuit for the relay 900 at armature 923. This relay is deenergized to close the drive circuit again over the original circuit.

In this manner the drive circuit between the first and the intermediate station functions to energize the synchronous relay chain at each end simultaneously and in turn to energize the selecting relays which latter connect their individual equipment across the control and supervisory line. In addition, the drive circuit heretofore mentioned controls the operation of the second drive circuit operating between the second and third station and is in turn controlled thereby. This second drive circuit in turn steps the relay chain at the third station and in turn its selector relays from contact to contact, connecting its individual equipment to the control and supervisory line.

It should be noted at this time that selecting relays at each station are so connected that for example, during the first five impulses, the selector relays connect in their turn, five apparatus units at the intermediate station to the control and supervisory line. No connecion is made at the third station during this interval and during the last five impulses, selecting relays at the third station connect their equipment in their turn to the control and supervisory line while no equipment is connected to the control and supervisory line at the intermediate station. In other words although there are a plurality of selecting relays operating simultaneously, only one pair of these is effective at any one time and they function as if there were but two groups of selecting relays.

When the seventh selecting relay at each station is energized, a circuit is completed from ground through battery, contact of the key 114, contact 111, back contact and armature 129, the middle contact of the bank 173 control conductor 157 through the contact of the seventh selecting relay over conductor 490, contact of the selecting relay 721, armature 707 and its front contact, winding of relay 703 and battery to ground. The energization of the relay 703 completes an energizing circuit for the solenoid 706 which in turn completes an energizing circuit for the operating magnet of the circuit breaker 725.

Operation of the circuit breaker 725 from its open to its closed position opens the energizing circuit for the relays 702 and 701. The relay 702 upon deenergization causes its armature 711 and 712 to drop to its back position.

The relay 701 being a slow-release relay will remain energized for a short interval of time after which it will permit its armature to drop to its back position. The deenergization of the relay 701 will open the energizing circuit for the slow-release relay 700 which after an interval of time will permit its armatures to drop to their back position. When armature 707 drops to its back position it places the relay 704 in the circuit, preparatory for any impulse for opening the now closed circuit breaker and the armature 708 drops to its back position to transmit a start impulse following the opening of the circuit breaker.

As a result of armature 709 dropping to its back position a supervisory impulse is transmitted to the office from ground through battery back contact and armature 709 contact of the selector switch 721, conductor 492, contact of selector switch 476, conductor 156, contact of the selector switch 149, armature 175 and its back contact and winding of relay 139 to ground. The energization of relay 139 operates latch 138 and permits the armatures 135, 136 and 137 to drop to their back positions. As a result of armature 135 dropping to its back position, an energizing circuit is completed for the lamp 107 which is illuminated to inform the dispatcher that the circuit breaker has been operated in accordance with the operation of this key.

The opening of the contact at armature 136 prevents the energization of relay 132 thereby preventing pumping of the circuit breaker and at armature 137 and its back contact an energizing circuit is completed for the relay 134, transferring the supervisory line from the relay 139 to the relay 133. The relay chains at the three stations now continue to be energized in synchronism in a manner as already described.

Upon the energization of the chain relay 211 and its equivalent ones 511 at the intermediate office and 811 at the remote station the apparatus are restored to normal. Upon the energization of relay 211, the shunt path at armature 250 is opened and the relay 222 is energized in series with the pairs of relay chains. The energization of relay 222 completes an energizing circuit for the relay 223 which at armature 256 opens the locking circuit for the relay chains and at armature 255 opens the locking circuit for the drive relays. In a similar manner at the intermediate and relay station the relay chain locking circuit is opened and the relay chain is restored to normal. Upon the energization of the relay 223, an energizing circuit is completed for the relay 302, from ground over armature 265, and its front contact, conductor 241, through the winding of the relay 302 and battery to ground. The energization of the relay 302 completes a locking circuit for itself at armature 350 over a circuit from ground through battery, the winding of the relay 302 front contact and armature 350 and the back contact and armature 318 to ground. A further result of the energization of the relay 302 is to open the locking circuit for the relays 303 and 304 at armature 351 and to open the energizing circuit for the relay 307 at armature 314. Relay 307 is thereupon deenergized and a circuit is prepared for the relay 305 over the back contact of armatures 316 and 320.

At the second station, the energization of the relay 513 completes an energizing circuit for the relay 603 from ground over armature 540 and its front contact, conductor 595, through the winding of the relay 603, and battery to ground. The energization of the relay 603 completes a locking circuit for itself over the front contact of its upper armature, and opens the energizing circuit for the relay 601 at armature 640. A further result of the energization of the relay 603 is to open the locking circuit for the relay 608 at armature 640. As a result of the deenergization of the relays 601, 607 and 608, an energizing circuit is prepared for the relay 602 over the back contacts of armature 648 and armature 637. A further result of the energization of the relay 513 is to open the locking circuit for the relay 600 at the armature 540.

The original holding circuit for the relays 305 at the office and 602 at the substation is thereupon completed and the drive circuit opened and all the relays are restored to their normal condition.

Relays 300 and 301 are deenergized by the movement of the armature 255 to its front contact and, in turn, opens the energizing circuit for the relay 322. The energizing circuit for relay 323 is opened at armature 320 on its back contact. The circuit for relay 326 is opened at the armature 340 now engaging its back contact. The locking circuit for the relays 325, 324, 328 and 327 are opened at the armature 255.

If a circuit breaker at the intermediate station should change its position, it will energize the relay 610 which will in turn produce an energizing circuit for relay 607 to start the operations in the manner already described. When the selecting relay to which the operated circuit breaker is connected is reached, a supervisory signal is transmitted to the dispatcher's office indicative of the apparatus units operated. The locking circuit for the relay 610 is opened at armature 646 and after a short interval of time the armature of this slow release relay moves to its back contact thereby opening the original energizing circuit for the relay 607 and the relays 607 and 608 energize in series. The energization of the relay 608 opens the holding circuit between the intermediate and the main stations with the result that the first drive circuit is completed. Thereupon a drive impulse is transmitted over the line in the manner that has already been described in detail to energize the first selecting relay. The energization of the first selecting relay, in turn, transfers the drive circuit to transmit a second drive impulse over the line in a manner that has been described.

The selecting relays are thus energized sequentially until the selecting relay individual to the particular apparatus unit is reached, at which point an impulse is transmitted over the supervisory line to operate the supervisory lamps in the manner which has already been described in detail.

If a circuit breaker, such as circuit breaker 725 at the more remote station, should operate automatically, the energizing circuit for the relay 702 would be opened at the pallet switches of the circuit breaker. Deenergization of the relay 702 completes an energizing circuit for the relay 909 from ground through armature 711 and its back contact, front contact and armature 708, conductor 750 through winding of relay 909 and battery to ground.

The energization of the relay 909 completes an energizing circuit from ground through armature 933 and its front contact, armature 931 and its front contact, conductor 993 over conductor 490, conductor 485, armature 651 and its front contact, winding of relay 610 and battery to ground.

The energization of relay 610 locks itself over armature 653 from ground through battery, winding of relay 610, front contact and armature 653, back contact and armature 646, and back contact and armature 640 to ground and completes an energizing circuit for the relay 607 at armature 654.

The energization of the relay 607 prepares a series locking circuit for itself and relay 608 over armature 646 and its front contact which is not affected at this time due to the original energizing circuit for the relay 607.

After an interval of time, the relay 701 is deenergized following the deenergization of relay 702 and, in turn, deenergizes the relay 700. Upon the deenergization of the relay 700, the energizing circuit for the relay 909 is opened at armature 708. Relay 909 is a slow-release relay and after an interval of time opens the original energizing circuit for the relay 610.

The locking circuit for the relay 610 is opened upon the energization of relay 607, at armature 646 and the series locking circuit for the relays 607 and 608 now becomes effective to open another point of the original energizing circuit for the relay 607 at armature 649 and to open the normal energizing circuit for the relay 602 at the intermediate station and relay 305 at the office formerly traced.

From this point on, the drive circuit functions in a manner already described to step the counting chains at all three stations from contact to contact until the selecting relay associated with the circuit breaker 725 operates, whereupon a circuit is completed from ground through battery, back contact and armature 709, first contact of the selector switch 721, conductor 492 over the first contact of the selector switch 476, conductor 156, first contact of the selector switch 149, armature 175, back contact and winding of relay 139 to ground.

Energization of relay 139 operates its armature 138 to unlatch the armatures 135 to 137. Armature 137 closes an obvious energizing relay 134 to switch the supervisory line from relay 136 to 133, armature 139 opens the energizing circuit for the relay 132 and at armature 135 an energizing circuit is completed for the lamp 107 to give an indication to the dispatcher of the operation of the circuit breaker.

It will be noted that the relay 610 is controlled in multiple with the circuit from the remote station by circuit breaker 450. This latter circuit is completed over the conductor 462 to the relay 610 and functions to operate it in the manner described in connection with the circuit breaker 725 for supervisory operations.

If a circuit breaker should operate automatically at a time when the chain is in operation, the following operation will take place. Assuming that circuit breaker 450 operates automatically when the chain is in operation, a circuit will be completed momentarily over the conductor 462 in the manner described in detail above for energizing the relay 610. Relay 610 will not find a locking circuit for itself at this time, but will complete an energizing circuit for the relay 605. It will be recalled that upon the operation of the chain, the circuit for relay 609 is opened at armature 638. Upon deenergization of the relay 609, a circuit is prepared for the relay 605 at armature 650 and its back contact. This circuit is now completed upon the energization of relay 610 from ground over armature 654 and its front contact and armature 650 and its back contact, the upper armature of relay 606 and its back contact, and thru the winding of relay 605 to battery and ground. The energization of the relay 605 prepares a locking circuit for itself and the winding of relay 606 over the armature of relay 605 and its front contact and the back contact and armature of the relay 604. After an interval of time, the relay 610 will deenergize and this locking circuit is completed. An energizing circuit is thereupon prepared for the relay 604 at the armature 695. But this circuit is not effective at this time for the reason that the relay 609 being deenergized, the armature 652 is not in engagement with its front contact.

At the end of the complete cycle of operation, the relays 607 and 608 which have been energized by the previous operation, are deenergized in the manner which has been described in detail and the relay 609 is again energized over the armature 638 and its front contact. Upon the energization of the relay 609, an energizing circuit is prepared for the relay 607 from ground over the lower armature of the relay 606 and its front contact, the armature 650 and its front contact, armature 649 and its back contact, through the winding of the relay 607 and battery to ground. The energization of relay 607 prepares a locking circuit for itself and the relay 608 at armature 646. Upon the energization of the relay 607 over the circuit just traced and the energization of the relay 609, a circuit is completed for the relay 604, from ground to battery, armature 607 and its front contact, the armature 699 and its front contact through the winding of the relay 604, the front contact and armature 652 and ground. As a result of the energization of relay 604 over the circuit just traced, the locking circuit for the relay 605 and 606 is opened at the armature of the relay 604 and these relays are deenergized. The deenergization of the relay 606 opens the original energizing circuit for the relay 607, the relays 607 and 608 now energize in series. Upon the energization of the relay 608, the holding circuit is opened at armature 648 and the operations started. The same arrangement is provided for starting the chain into operation, should a circuit breaker automatically operate at the third station during a cycle of operation.

It often happens, that due to troubles in the relay chain or for any of various reasons, the dispatcher desires to reset the chain of relays to normal without going on through the cycle of operations. Since it is necessary as the chain is disclosed to go through the complete cycle before an automatic restoration takes place, provision is here made whereby the dispatcher can automatically restore the chain of relays to normal at any point in the counting chain. This is accomplished by means of the relays 234 and 224 and 225 at the office, 514 to 516 at the second station and 824, 825 and 827 at the third station. By closing the contacts of the restoring key 140, a circuit is completed from ground through the alternator 175, over the contacts of the restoring key 140 through the conductor 176 to the winding of the alternating current relay 224 and the second winding 234. A multiple circuit is completed over the control line 295 through the windings 515 and 514 of the alternating current relay at the substation, and through the windings 824 and 825 of the alternating current relay at the third station. As a result of the energization of the alternating current relays 224 and 234 at the office, an obvious energizing circuit is completed for the relay 225. As a result of the energization of the relay 225, an energizing circuit is completed for the relay 211 from ground over the armature of the relay 225 and its front contact through the armature and back contact of the winding of relay 211 through the winding of relay 210, the back contact and armature 250 and battery to ground. The energization of the relay 210 prepares a locking circuit for itself and the winding of relay 211 over the front contact and armature of the relay 210, from ground over armature 256 and its back contact, the armature of the relay 210 and its front contact, winding of relays 210 and 211 in series, the armature 250 and its back contact to battery and ground. When now the key 240 which is only momentarily closed, is opened, the windings of alternating current relays are deenergized to open the energizing circuit for the relay 225. Upon the deenergization of the relay 225 the original energizing circuit for the relay 210 is opened and the relays 210 and 211 energize in series over the circuit traced above. Upon the energization of the relay 211, the locking circuit for all of the counting relays is opened at armature 250 and all of the counting relays are deenergized. Upon the opening of the circuit at armature 250, the relay 222 is energized in series with the counting relays and operates its armature to complete an energizing circuit for the relay 223, which upon energization operates the restoring apparatus in the manner which has already been described in detail. The alternating current relays at the second and third stations operate in the same manner to restore the apparatus at these stations to normal.

Although this invention has been disclosed in connection with supervisory control systems, it is obvious that it is broadly applicable to any signalling system and I do not therefore, intend to limit myself to this particular application thereof.

I claim as my invention:

1. In a signalling system comprising a first station, a second and a third station, impulse distributors at said stations, the method of maintaining synchronism of said distributors which consists in stepping two of said distributors one step in response to an impulse, repeating said impulse to a third station to step the distributor thereat and controlling said first impulse simultaneously by said third station distributor and said second station distributor.

2. In a supervisory control system, the combination of three or more stations, relay-chain distributors at said stations, impulse means for maintaining said distributors in synchronism and means whereby all said distributors control said impulse means.

3. In a signalling system, comprising a first station, a second station, a third station and a distributor at each station, the method of synchronizing said distributors which comprises transmitting an impulse from said first to said second station, stepping said distributors responsive to said impulse, repeating said impulse from said second to said third station, stepping said third distributor responsive to said impulse, and controlling the transmission of a second impulse from said first to said second station from all three stations.

4. In a signalling system, a first station, a plurality of remote stations, distributors at each of said stations, means for maintaining said distributors at all of said stations in synchronism when in operation, said distributors having a normal non-operating position and means for restoring said distributors at all of said stations to normal under control from said first station, from any point in their operating cycle.

5. In a signalling system, a first station, a plurality of remote stations, a distributor at each of said stations, said distributors having a normal non-operating position, means for starting said distributors into operation from any of said stations, and means controlled from said first station for restoring all of said distributors to normal at any point in the operation thereof.

6. In combination, a control station, a plurality of remote stations, a plurality of devices at each of said remote stations to be controlled from the control station, a series of relays at said control station and a corresponding series of relays at each of the remote stations, a plurality of conductors each connecting a station with its succeeding station, a plurality of second conductors each connecting a station with its succeeding station, means for impressing impulses of current on the one of said second conductors extending from said control station to the succeeding station, means responsive to said impulses for transmitting impulses over another of said second conductors extending from said second station to its succeeding station, means controlled by said impulses for operating said relays at each station in synchronism, means controlled by the synchronous operation of said relays for controlling the transmission of said impulses over said second conductors, an operating relay at each of said remote stations for each device thereat to be controlled, normally disconnected from the first mentioned conductor thereat, a key at the control station for each device to be controlled, normally disconnected from the first conductor extending therefrom and associated with a source of current and means whereby said series of relays in sequential and synchronous operation, connect in sequence and one at a time the operating relays and the corresponding keys over said first conductors.

In testimony whereof, I have hereunto subscribed my name this second day of March, 1926.

THOMAS U. WHITE.